W. PARRIOTT.
AGRICULTURAL IMPLEMENT.
APPLICATION FILED SEPT. 4, 1917.
1,276,403.
Patented Aug. 20, 1918.
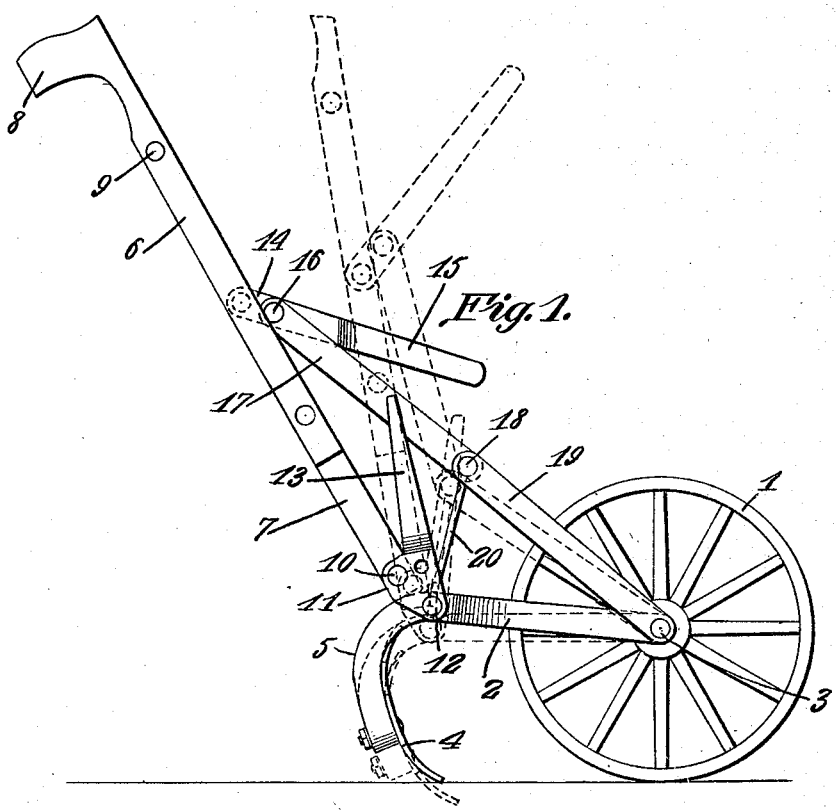
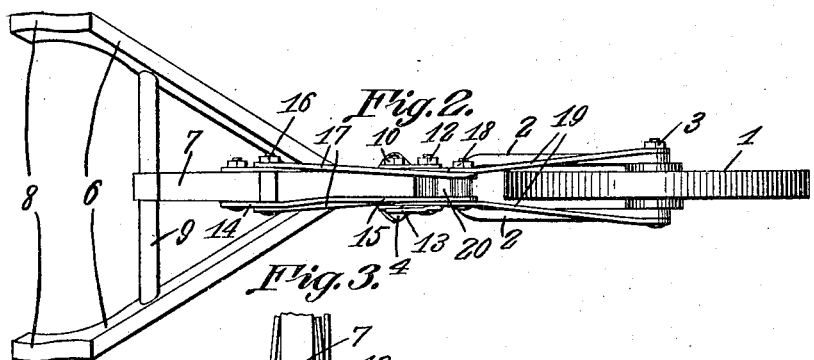
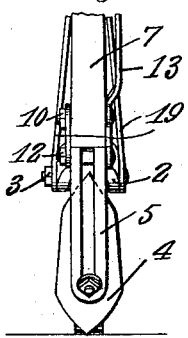
William Parriott, INVENTOR
WITNESSES
John M. Dobie
Wm. D. Fowler
BY Richard B. Owen.
ATTORNEY

UNITED STATES PATENT OFFICE.

WILLIAM PARRIOTT, OF DETROIT, MICHIGAN.

AGRICULTURAL IMPLEMENT.

1,276,403.  Specification of Letters Patent.  Patented Aug. 20, 1918.

Application filed September 4, 1917. Serial No. 189,579.

*To all whom it may concern:*

Be it known that I, WILLIAM PARRIOTT, a citizen of the United States, residing at Detroit, in the county of Wayne and State of Michigan, have invented certain new and useful Improvements in Agricultural Implements, of which the following is a specification.

This invention relates to certain new and useful improvements in agricultural implements and relates more particularly to plows.

The primary object of the invention resides in the provision of a plow having adjustable connections between the handles and the frame, whereby the plow proper or cultivator blade may be raised or lowered without materially changing the incline of the handles.

Another object of the invention resides in the provision of a connection of this character and adjusting levers which may be readily incorporated in a walking cultivator or other form of agricultural implement without materially increasing the cost of the same.

A further object resides in the provision of a plow or cultivator in which the parts may be readily adjusted to vary the depth of the furrow, as desired.

With these and other objects in view, as will be apparent from the following paragraphs, the invention resides in the novel construction, combination and arrangement of parts as will be hereinafter more specifically set forth, pointed out in the appended claims and shown in the drawings, in which:

Figure 1 is a side elevation of the complete device with the parts shown in novel position by full lines and in the other extreme position by dotted lines.

Fig. 2 is a top plan view, and

Fig. 3 is a rear elevation of the lower portion of the device.

Referring more particularly to the drawings, in which similar reference characters designate corresponding parts throughout the several views, the numeral 1 designates the guide wheel upon the axle of which is mounted the frame of conventional form. This frame includes a beam 2 having its forward end pivotally secured to the axle 3 of the wheel and having its rear end curved downwardly to support the cultivator blade 4 the downwardly curved portion of said beam providing a standard 5.

The upwardly diverging handles 6 are connected at their lower ends to the opposite sides of the handle carrying member 7, the upper end of which terminates below the upper rearwardly turned extremities 8 of said handle 6 and between the latter, a connecting and bracing cross bar 9 being extended through the upper extremity of said member 7 and secured in the sides of said handles 6, as clearly shown in Fig. 2.

The extended lower end of the member 7 is pivoted, as shown at 10, between the links 11, one of which is of substantially triangular form and has its lower corner mounted upon the pivot pin 12, extended through the curved rear end 5 of the frame 2 and also serving as a pivot for the lower end of the opposite link 11. It will be understood that the pivot pin 10 extends through the upper rear corner of the triangular link 11 while an integral lever 13 extends upwardly from the upper forward corner of said triangular link 11. The purpose of the lever 13 and the triangular link 11 and its complementary link designated by the same numeral, will presently appear.

Pivoted to the upper portion of the handle carrying member 7 are the links 14, one of which links is extended to form an adjusting lever 15. The links 14 are connected by a pivot member 16, upon which are mounted the upper ends of the upper adjusting bars 17 which bars are arranged in parallel relation and have their lower ends mounted upon the pin 18, which latter forms a joint or connection between the upper adjusting bars 17 and the lower adjusting bars 19. These last mentioned adjusting rods are mounted by their upper ends upon the pin 18 while their lower ends are mounted upon the axle 3 of the wheel 1. The pin 18 is carried in the upper end of the supporting bar 20, the lower end of which is mounted upon the pin 12, within the frame 2.

It will be evident that, owing to the connection between the handles and the frame of the implement, it will simply be necessary to swing upwardly the adjusting lever 15 to break the joint between the upper and lower adjusting rods 17 and thereby force the cultivator blade or shovel 4 deeper into the ground and thereby increase the depth of the furrow, without materially changing the angle or incline of the handles 6. If, however, the handles 6 should be carried too far forwardly, the adjusting lever 13 may be readily operated to swing forwardly the lower end of the handle member 7 and thereby throw rearwardly the upper ends 8 of said handles 6. This adjustment of the cultivator blade or shovel 4 and the handles 6 may be readily accomplished.

While the form of the invention shown and described is what is believed to be the preferred embodiment thereof, it is nevertheless to be understood that minor changes may be made therein within the scope of the appended claims, without departing from the spirit of the invention.

I claim—

1. In an agricultural implement, the combination with the guide wheel and axle and blade carrying frame mounted on said axle, of a handle supporting member, link connections between said handle supporting member and said frame, upper adjusting bars, lower adjusting bars mounted on said axle, a lever carried by said handle supporting member, said upper adjusting bars being pivotally connected with said lever, and a pivotal connection between said upper adjusting bars and said lower adjusting bars.

2. In an agricultural implement, the combination with a cultivator frame, a blade mounted upon one end of said frame, an axle carried by the opposite end of said frame and a wheel mounted upon said axle, of a handle carrying member, handles mounted upon said member, a pair of links connecting said member with said frame at its rear end, one of said links being extended to form a lever, pivoted adjusting bars connecting the upper portion of said member with said axle, and a bar connecting said links with said adjusting bars at the point of connection of the latter.

3. In an agricultural implement, the combination with the blade carrying frame and guide wheel axle, of a handle supporting member, handles carried by said member, links at the lower end of said member, a pivot member connecting said links with said frame, a bar mounted upon said pivot member, lower adjusting bars pivoted upon said last mentioned bar and mounted upon said axle, upper adjusting bars pivoted upon the first mentioned bar, a lever pivoted to said handle carrying member, and pivotal connection between said lever and said upper adjusting bars.

4. In an agricultural implement, the combination with the frame and axle of an agricultural implement, of handles having adjustable connection with said frame, and jointed connecting bars extended from said handles to said axle.

5. In an agricultural implement, the combination with the frame and axle thereof, of jointed connections between said axle and the handles of said cultivator, an adjusting lever for breaking the joint, and means for adjusting the lower end of the handles with respect to the frame for the purpose of varying the incline of the handles.

6. In an agricultural implement, the combination with the handles, the handle supporting member, the frame and the axle, of link connections between said member and the rear end of the frame, a lever carried by said link connections to vary the incline of the handles and handle supporting member, a lever carried by said member, and a jointed connection between said lever and said axle, whereby the height of the implement carrying end of the frame may be adjusted to vary the depth of the furrow.

7. An agricultural implement including a plow beam, a plow blade carried by the rear end of said beam, a wheel carried by the forward end of said beam, a handle supporting member for said beam, links connecting the lower end of said handle member with the rear end of the beam, a lever integral with one of said links, a pair of adjusting bars pivotally secured to the forward end of said beam, a second pair of bars pivotally secured to the free ends of said first bars, links connecting the free ends of said second bars to said handle member, and a lever integral with one of said links.

8. In an agricultural implement, the combination with an implement supporting frame, of handles movably connected with said frame, a jointed connected between said handles and frame, and a lever operatively connected with said connection.

In testimony whereof I affix my signature in presence of two witnesses.

WILLIAM PARRIOTT.

Witnesses:
M. JAMES MURPHY,
FRANK T. STACK.

Copies of this patent may be obtained for five cents each, by addressing the "Commissioner of Patents, Washington, D. C."